United States Patent [19]

Knowlton

[11] 3,909,823
[45] Sept. 30, 1975

[54] OPTICAL FIBER VARIABLE DISPLAY SYSTEM UTILIZING A SINGLE LIGHT SOURCE

[76] Inventor: Keith L. Knowlton, Mill Lane Rd., Brimfield, Mass. 01010

[22] Filed: Mar. 26, 1974

[21] Appl. No.: 456,275

[52] U.S. Cl. ............ 340/336; 340/380; 350/160 LC
[51] Int. Cl.² .................... G09F 9/32; G02F 1/18
[58] Field of Search ........... 340/324 R, 324 M, 336, 340/380; 350/160 LC, 160 R

[56] References Cited
UNITED STATES PATENTS

| 3,744,878 | 7/1973 | Kiemle et al. | 340/324 M |
| 3,750,136 | 7/1973 | Roess | 340/336 |
| 3,797,012 | 3/1974 | Gibbs et al. | 340/380 |
| 3,820,096 | 6/1974 | Himmelsbach et al. | 340/380 |
| 3,824,604 | 7/1974 | Stein | 350/160 LC |
| 3,836,911 | 9/1974 | Gibson et al. | 340/380 |

Primary Examiner—John W. Caldwell
Assistant Examiner—Marshall M. Curtis
Attorney, Agent, or Firm—Milton E. Kleinman

[57] ABSTRACT

A variable display is formed of a plurality of light transmitting lenses selectively illuminated from a single light source. Optical fiber light pipes lead from the light source to each lens. A shutter for each lens provides means for allowing the illumination of selected lenses and blocking the light to other lenses so that a variable lighted display is formed against a dark background of light-blocked lenses.

15 Claims, 4 Drawing Figures

AN OPTICAL FIBER VARIABLE DISPLAY SYSTEM UTILIZING A SINGLE LIGHT SOURCE

BACKGROUND OF THE INVENTION

This invention relates to a message character display designed to display a variety of information such as alphanumeric symbols. Often, these variable displays utilize a stencil mask having the shape of the desired symbol positioned between a light source and the display medium, or alternately, a multiplicity of light sources are provided with means for energizing or deenergizing the same in a pattern corresponding to the desired symbol. Although these displays can be variable, they have certain apparent shortcomings which limit their use and desirability for many applications. For example, displays using marks are limited by the particular stencil masks physically prepared and included in the display and there is the further limitation that the masks cannot be readily changed. Displays using a multiplicity of light sources require a large number of separately energized light bulbs. As various ones of the bulbs expire, they must be replaced before they adversely effect the informational content of the displayed message. Such frequent maintenance is difficult as the light bulbs are part of the displayed areas which are often positioned in relatively inaccessible locations, for example, to provide information to a motorist as he enters a vehicle tunnel. Advantages inherent in the present invention overcome the aforementioned limitations and provide a variable display that can be utilized in more diverse and demanding display applications.

SUMMARY OF THE INVENTION

A display arrangement is formed with as many light transmitting lenses as may be desired usually in a regular pattern or matrix array at which a substantial portion of the display area is taken up with such lenses. These lenses are preferably auto-collimating and each one is connected by a light pipe made of optical fibers to a common source of light which may be some distance away and not necessarily close to the display area.

A shutter means is provided for each lens. Such shutter means may be mechanical, magnetic or electronic, such as may be known in the art. However, the preferred embodiment described herein utilizes a liquid organic crystal material in which there is no mechanical motion involved, the inherent characteristics of the liquid crystals being utilized to gate the light therethrough. The liquid crystal shutter is formed of two transparent pieces of material arranged in a thin sandwich relationship and filled with a liquid crystal material.

Although the display device described above may be controlled as to the operation of the shutters by any suitable means, in the case of electric or magnetic shutters and in particular with the described liquid crystal shutters, the control consists of an electrical gating signal to each shutter and electrical decoding selector produces an array of gating signals for energizing or deenergizing the shutters in a pattern desired to produce alphnumeric characters by illuminating selected ones of the lenses. When an electrical signal is selectively applied to the liquid crystal shutters, the liquid crystal material contained therein can be made opaque so that light will not pass through the sandwich or, alternately, the liquid crystal material can be made clear and transparent so that it is not visible between the adjacent plates of transparent material.

When all the lenses are dark, there is no pattern at all that can be seen, contrary to displays using masks, neon tubes, etc., so that there is no confusion as to whether the display is operating or not, caused by light such as sunlight falling on the sign and thereby in some cases providing a misleading or erroneous display.

It is an additional object of this invention to provide a display having the further advantages of being readily adaptable to multicolor representations and selected levels of illuminated intensity.

Other objects and many additional attendant advantageous of this invention will be readily appreciated as the same becoming better understood by reference to the following detailed description when considered with the accompanying diagrammatic representative drawings.

DESCRIPTION OF THE PREFERRED EMBODIMENT

In order to provide a clear understanding of the present invention, a preferred embodiment thereof will be considered from a number of viewpoints and in an order which will best reveal its novel features and advantages. First, an overall view of a display illustrating a method of character presentation on a matrix of lenses will be presented to clarify the functional context of the subject invention. Next, it will be shown how the individual lenses of the display are illuminated in a controlled and selectable fashion in accordance with the invention. Then, a detailed description of the crystal shutter used to gate the illumination to each of the lenses of the display will be provided. Finally, a further improvement to the basic display system will be described to exemplify inherent advantages and versatilities of a display utilizing the subject invention.

Figure 1:
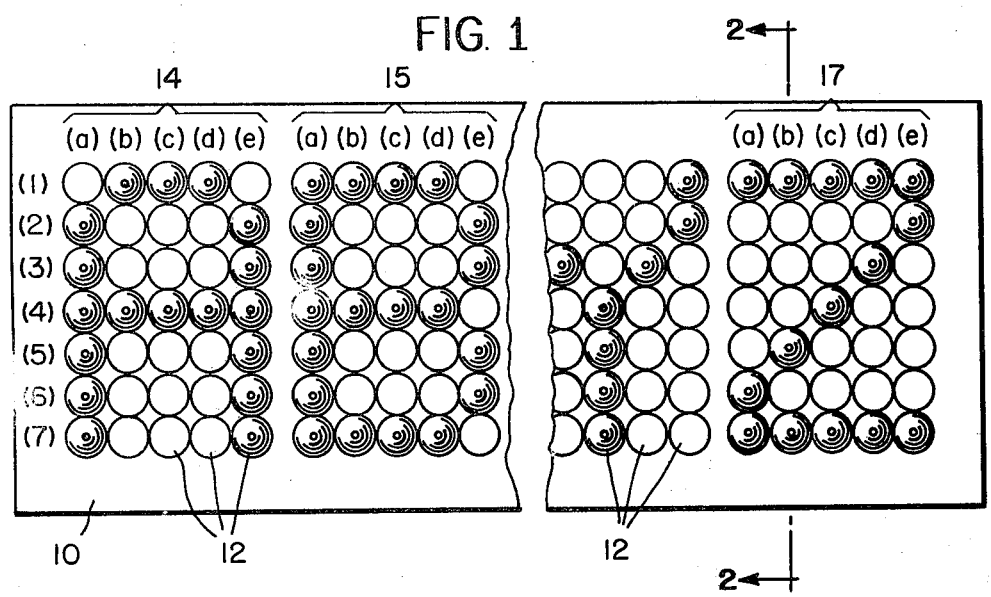
FIG. 1 is a view of the front face of a display according to the present invention illustrating thereon a coded character presentation.

Referring first to FIG. 1 therein is shown a display frame 10 in which are mounted a multiplicity of transparent lenses 12. The lenses 12 are arranged in an array, or matrix, that alphanumeric characters can readily be produced on by illuminating selected ones of the lenses 12. For explanatory purposes, the array of lenses 12 are shown to include character fields 14, 15 . . . 17 each arranged in a 5×7 matrix of 35 lenses. The vertical columns of each character field 14, 15 . . . 17 are identified by the letters, a, b, c, d, and e; and the horizontal rows of lenses in the matrix of each character field 14, 15 . . . 17 are identified as 1, 2, 3, 4, 5, 6 and 7, in that order. If, as shown in character field 14, particular lenses 12 designated as rows 2 through 7 in columns a and e and rows 1 and 4 in columns b, c and d are illuminated, the lighted representation would be that of a letter "A". In a similar manner, the letter "B"

is produced in character field 15 by illuminating particular lenses 12 designated as rows 1 through 7 in column a, rows 1, 4 and 7 in columns b, c and d, and rows 2, 3, 5, 6 in column e. The letter "Z" is produced in character field 17 by illuminating the lenses indicated therein. Practically any letter, number of symbol can be a similarly produced display pattern.

While a 5×7 character field matrix has been described, it is understood that an array using fewer lenses can produce most of the desired characters, but some of them might be somewhat indistinct. On the other hand, a character field having a greater number of lenses would be able to produce more distinct characters, but at the expense of additional apparatus and decoding circuitry to be further described with reference to FIG. 2.

Figure 2:
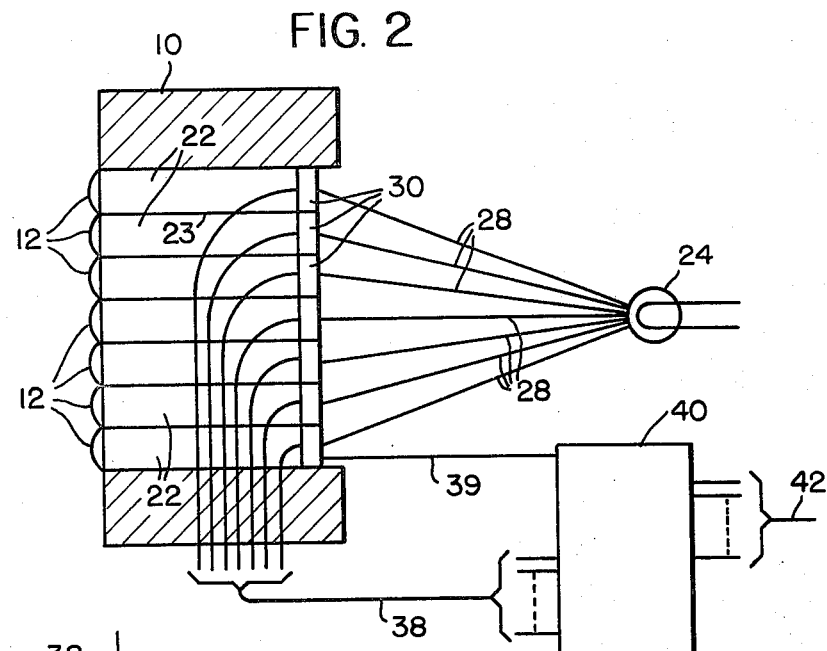
FIG. 2 is a diagrammatic sectional view on an enlarged scale of the display shown in FIG. 1 on the line 2—2.

Referring now to FIG. 2, therein is shown a diagrammatic sectional view on an enlarged scale of the display shown in FIG. 1. A column of seven lenses 12 are supported between an upper and lower portion of display frame 10. Each lens 12 has associated with it a cylindrical displacement 22 having a length 23 that is typically equal to the back focal length of the lens 12. A liquid crystal shutter 30 is on the end of each cylindrical displacement 22 opposite the lens 12. A single light source 24 is commonly connected by a bundle of light pipes 28 made of optical fibers to the entrance side of each shutter 30 so that light is continuously present on the entrance side of each shutter 30. When the shutter 30 is opened, the light crosses the cylindrical displacement 22 to illuminate the corresponding lens 12.

Figure 3:
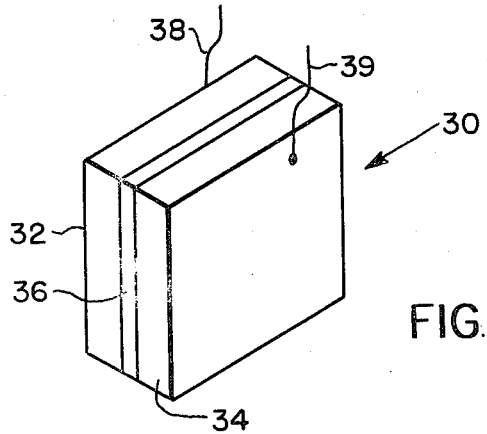
FIG. 3 is a detail view more particularly illustrating the liquid crystal shutter shown in FIG. 2.

At this point, the liquid crystal shutter 30 will be described with reference to FIG. 3 in order to facilitate the further description of FIG. 2. However, it is understood that there are several types of shutters available for use such as used for cameras as well as magnetically operated screens and the like. In each case, the shutter has for its basic function to either open to allow light to pass through from the entrance side of the particular shutter 30 to its corresponding lens 12, or to be closed so that light is blocked from passing through the particular shutter 30 and its corresponding lens 12 is not illuminated, i.e., it is dark. In FIG. 3 there is shown a liquid crystal shutter 30 formed of two electrode-etched glass layers 32 and 34, or other transparent material, having between them a perimeter seal 36 to enclose a thin layer of liquid organic crystal material between glass layers 32 and 34. Signal line wires 38 and 39 connect to electrode-etched glass layers 32 and 34, respectively. A gating signal impressed on wires 38 and 39 causes the crystal shutter 30 to be "energized" or "deenergized". In order to facilitate this description, the liquid crystal 30 is said to be deenergized when the crystal material within glass layers 32 and 34 is transparent so that light routed by the fiber optics light pipe 28 (shown in FIG. 2) from the light source 24 is transferred through the crystal shutter 30 across the focal displacement length 23 to the lens 12. Conversely, the liquid crystal 30 is said to be energized when the light shuttering crystal material blocks the transfer of light from the fiber optic light pipe 28 to the lens 12.

Referring again to FIG. 2, it is seen that crystal shutters 30 have been assembled with a common electrode line 39 and an individual electrode selection line 38 from each crystal shutter 30 connecting to a decoding selector 40. The decoding selector 40 has input code lines 42 from a control source such as an operator console or similar control source which selects the message to be displayed. Output signals from the decoding selector 40 are applied to each of the individual electrodes 38 from each of the shutters 30 and to electrode 39 common to the shutters 30.

The decoding selector 40 receives a binary coded signal on input lines 42 designating a particular alphanumeric character, i.e., a selected pattern. The input signal is decoded by a logic gating matrix within the selector 40 so that the output signal produced on signal lines 38 to each of the shutters 30 corresponds to particular lenses to be illuminated in a display column of the alphanumeric character designated by the binary code on input lines 42. It is readily seen with reference to FIG. 1 that the decoding process in selector 40 would be a stored or handwired conversion of signals. For example, the letter A shown in character field 14 would be programmed or prewired to provide signals to only illuminate lenses in rows 2, 3, 4, 5, 6, and 7 of columns a and e and rows 1 and 4 of columns b, c, and d. Each of the other alphanumeric characters would be similarly decoded to display the desired pattern.

The operation of the display apparatus of the subject invention will now be described with reference to FIG. 2 and FIG. 1. However, it should first be understood that the description of the sectional view through a vertical column of lenses shown on FIG. 2. is appropriate for any one of the columns of lenses. For that matter, FIG. 2 could alternately have been a sectional view of a horizontal row of lenses in a character field 14, 15 or 17. Furthermore, the light source 24 would be commonly connected to light pipes 28 going to a plurality of vertical columns of lenses, the exact number being determined by such factors as a desired level of brilliance for the display, length of the light pipes, etc. Additional versatility and other efficiencies are obtained by modularizing the decoding selector 40 for each character field 14, 15 . . . 17. Such modularization is particularly adaptable to LSI technology where a single mask can be used to etch repetitive circuits.

In operation, a binary coded alphanumeric is applied on input code lines 42 to decoding selector 40. As shown, if the code for the letter Z is applied to decoding selector 40 on input lines 42, the signals applied on lines 38 to each of the shutters in column b of character field 17 energizes the shutters 30 for rows 1, 5 and 7. Since each of the shutters 30 are backlighted by light carrying pipes 28 from the common light source 24, when the shutters for rows 1, 5 and 7 of column b are deenergized they become transparent permitting the light to pass through these shutters 30 across the cylindrical displacement to illuminate their respective lenses 12. In a similar manner, the appropriate shutters for columns a, c, d and e are also deenergized by signals from decoding selector 40 to form the letter Z in character field 17.

Figure 4:
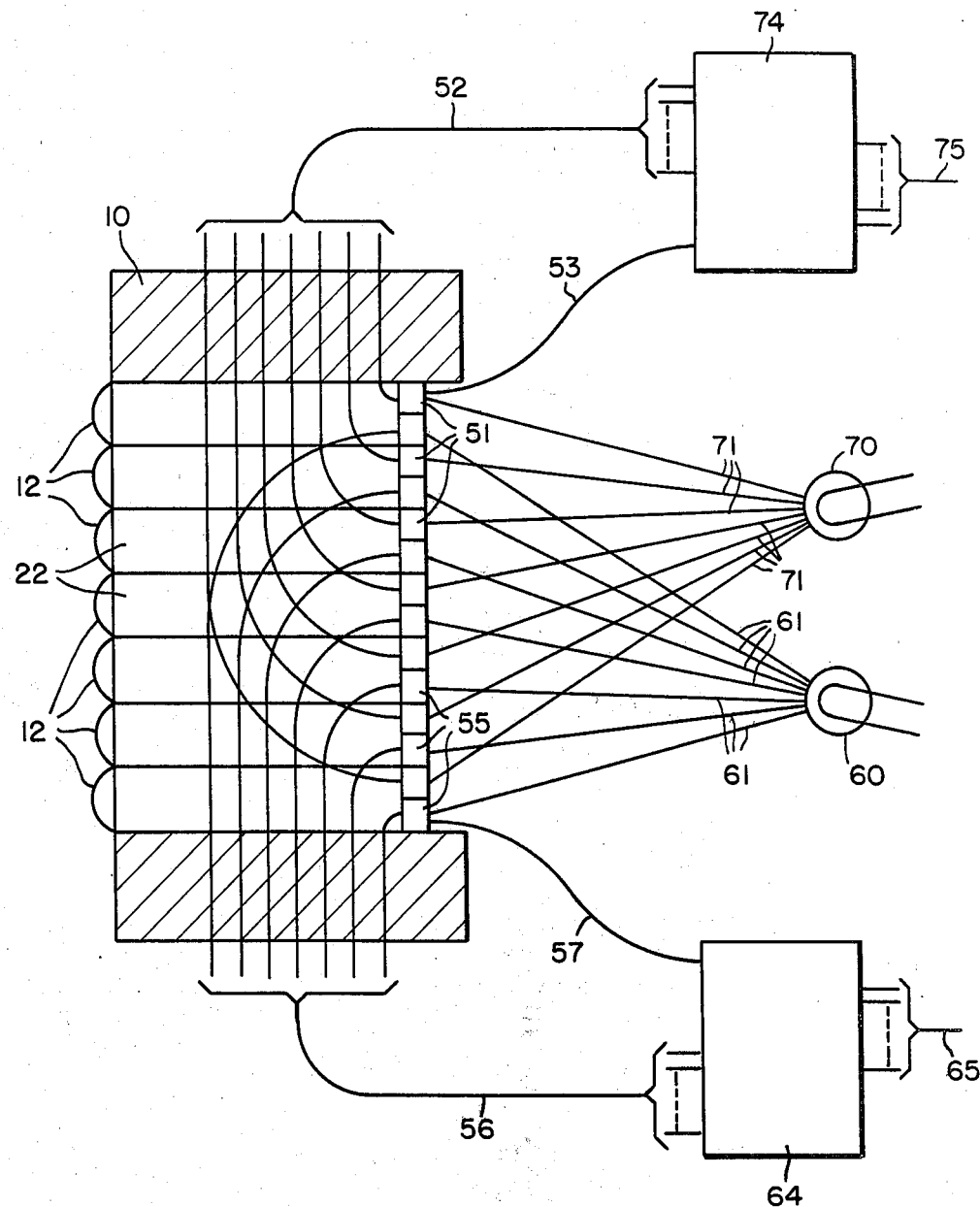
FIG. 4 is an alternate embodiment of the present invention shown as an alternative to the diagrammatic view of FIG. 2.

Referring now to FIG. 4, therein is shown an alternate embodiment of the diagrammatic representation of the cross sectional view shown in FIG. 2. To facilitate the description of FIG. 4, correlations will be used to FIG. 2 to and the preceding description. The column of lenses 12 are boundered by portions of display from 10. EAch lens 12 has associated therewith a cylindrical displacement 22. At the end of each cylindrical displacement 22 opposite the lens 12 is a pair of adjacent crystal shutters 51 and 55, upper and lower shutters respectively. Each of the shutters 51 and 55 correspond to the description of the liquid crystal shutter 30 previously described with reference to FIG. 3, shutters 51 having individual electrode selection lines 52 and a common electrode line 53, and shutters 55 having individual electrode selection lines 56 and a common electrode line 57. Individual electrode selection lines 52 and 56 correspond to line signal line wire 38 shown in FIG. 3 and common electrode lines 53 and 57 correspond to signal line wire 39.

A first light source 60 is commonly connected by a bundle of light pipes 61 of optical fibers to the entrance side of each shutter 55 so that light from light source 60 is continously present on the entrance side of each shutter 55. When the shutter 55 is open, the light originating from light source 60 crosses the cylindrical displacement 22 to illuminate the corresponding lens 12. In addition, a second light source 70 is commonly connected by a bundle of light pipes 71 of optical fibers to the entrance side of each shutter 51 so that light from light source 70 is continuously present on the entrance side of each shutter 51. When the shutter 51 is open, the light from light source 70 crosses the cylindrical displacement 22 to illuminate the corresponding lens 12. Accordingly, it should now be understood that each of the lens 12 may be selectively illuminated from either light 60 or light source 70 or a combination of these two light sources by selectively operating shutter 55 or shutter 51 or both shutters 55 and 51, respectively.

The crystal shutters 55 have their common electrode line 57 and an individual electrode selection line 56 from each crystal shutter 55 connecting to a decoding selector 64. Crystal shutters 51 have their common electrode line 53 and an individual electrode selection line 52 from each crystal shutter 51 connecting to a decoding selector 74. Selectors 64 and 74 generally correspond to decoding selector 40 previously described with reference to FIGS. 1 and 2. Decoding selectors 64 and 74 have input code lines 65 and 75, respectively, from an operator console or similar control source.

It should now be understood that by selectively applying an appropriate signal on input line 65 to decoding selector 64, selected lens 12 can be illuminated by light originating with light source 60 and routed through light pipes 61 and selected shutters 55 and across cylindrical displacement 22 to corresponding lens 12. Conversely, by selectively applying an appropriate signal on input line 75 to decoding selector 74, selected lens 12 can be illuminated by light originating with light source 70 and routed through light pipes 71 and selected shutters 51 and across cylindrical displacement 22 to corresponding lens 12. It can now be readily appreciated that should light sources 60 and 70 be of different colors, for example, red and green, the displayed information can readily be changed from the one color to the other. Indeed, the two colors could even be used simultaneously within the displayed message.

A further variation of the described embodiment would be to selectively combine the light originating from both light sources 60 and 70 routed through their respective light pipes and shutters to commonly illuminate selected lens 12. In this manner, the colors from light sources 60 and 70 can be mixed to form a third color or, alternately, the luminous intensity of the light on lens 12 can be varied by applying thereon the light from either one or both light sources 60 and 70 having either the same or mixing light colors.

The invention in its broader aspects is not limited to the specific details shown and described. Departures can be made from these details without departing from the principles of the invention and without sacrificing its chief advantages. For example, the shutters can be placed adjacent to the lens at the same end of the cylindrical displacement, the shutters can be placed between the light pipes and the light source, the lens can be of a rectangular shape, or the cylindrical displacement can be changed in shape to further accommodate either the lenses of the enclosing structure.

What is claimed is:

1. A variable display comprising a group of lenses facing in a common direction,
   a single light source, optical fiber light transmitting means adapted to concurrently illuminate each lens in said group of lenses from said single light source,
   a light shutter for each lens providing means for selectively illuminating or darkening each lens, so that selected light transmitting lenses form a lighted display against a dark background of light-blocked lenses, and
   selector means controlling the said light shutters to cause certain lenses to light and the others to remain dark to illuminate said lenses in a variety of display patterns.

2. The variable display of claim 1 wherein the light shutters are liquid crystal shutters.

3. The variable display of claim 2 including electrical means for each of said liquid crystal shutters for energizing and deenergizing each shutter.

4. A variable display comprising
   a series of lenses arranged in an orderly array, said lenses being light transmitting,
   a shutter for each lens to selectively allow light to pass through the lens or to prevent the light from passing therethrough,
   means to operate the shutters,
   a light pipe for each shutter and its lens, and
   a single source of illumination for the plurality of light pipes.

5. The variable display of claim 4 wherein the lenses are substantially auto-collimating.

6. The variable display of claim 4 wherein the means to operate the shutters is constructed and arranged to operate each shutter independently of the others.

7. The variable display of claim 4 wherein
   the shutter comprises liquid crystal material and electrical means connected with respect thereto under control of said shutter operating means.

8. The variable display of claim 7 wherein said electrical means independently operates each liquid crystal shutter for each lens.

9. The variable display of claim 7 wherein the electrical means is controlled by the shutter operating means to selectively energize or deenergize the liquid crystal shutters.

10. The variable display of claim 4 wherein said shutter operating means independently controls each of said shutters to illuminate a display pattern on said series of lenses.

11. The variable display of claim 10 wherein said shutter operating means additionally provides means for decoding a pattern selection signal to produce a plurality of signals to control said shutters to display a variety of displayed patterns, each pattern corresponding to the pattern selected signal.

12. A variable symbol display comprising:
   a series of lenses arranged in an orderly array on said display,
   a light source,
   a bundle of light pipes providing means for illuminating said lenses from said light source, and
   a group of shutters including a shutter for each lens providing means for individually gating on and off the illumination from said light source to each of said lenses, and
   a decoding selector means controlling said shutters to selectively illuminate said lenses in a variety of display patterns.

13. The variable display of claim 12 including
   a second light source,
   a second bundle of light pipes providing means for illuminating said lenses from said second light source,
   a second group of shutters including a second shutter providing means for each individually gating on and off the illumination to each of said lenses, and
   said decoding selector means providing additional means for controlling each of said second group of shutters to illuminate said lenses in a variety of display pattern.

14. The variable display of claim 13 wherein said decoding selector means provides means for illuminating selected ones of said lenses from one of said first and second light source.

15. The variable display of claim 13 wherein said decoding selector means provides means for illuminating selected ones of said lenses from both said first and second light source.

* * * * *